(12) United States Patent
Colgrove et al.

(10) Patent No.: US 10,565,183 B1
(45) Date of Patent: Feb. 18, 2020

(54) EFFICIENT DEDUPLICATION SIGNATURE UTILIZATION

(71) Applicant: PURE STORAGE, INC., Mountain View, CA (US)

(72) Inventors: John Colgrove, Los Altos, CA (US); Ronald Karr, Palo Alto, CA (US); Vinay K. Perneti, Mountain View, CA (US); Feng Wang, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 485 days.

(21) Appl. No.: 15/338,746

(22) Filed: Oct. 31, 2016

Related U.S. Application Data

(60) Provisional application No. 62/330,728, filed on May 2, 2016.

(51) Int. Cl.
  *G06F 16/23* (2019.01)
  *G06F 16/22* (2019.01)
  *G06F 16/25* (2019.01)

(52) U.S. Cl.
  CPC ...... *G06F 16/2365* (2019.01); *G06F 16/2255* (2019.01); *G06F 16/258* (2019.01)

(58) Field of Classification Search
  CPC ............. G06F 16/2255; G06F 16/1748; G06F 17/30253; G06F 17/30156; G06F 3/0641; G06F 16/2365
  USPC .......................................................... 707/692
  See application file for complete search history.

(56) References Cited

U.S. PATENT DOCUMENTS

| | | | |
|---|---|---|---|
| 6,286,056 B1 | 9/2001 | Edgar et al. | |
| 6,804,703 B1 | 10/2004 | Allen et al. | |
| 6,954,881 B1 | 10/2005 | Flynn, Jr. et al. | |
| 7,139,907 B2 | 11/2006 | Bakke et al. | |
| 7,272,674 B1 | 9/2007 | Nandi et al. | |
| 7,313,636 B2 | 12/2007 | Qi | |
| 7,409,526 B1 * | 8/2008 | Ng | H04L 9/0894 |
| | | | 711/216 |
| 7,577,802 B1 | 8/2009 | Parsons | |
| 8,103,754 B1 | 1/2012 | Luong et al. | |
| 8,301,811 B1 | 10/2012 | Wigmore et al. | |
| 8,538,933 B1 * | 9/2013 | Hu | G06F 3/0641 |
| | | | 707/692 |

(Continued)

FOREIGN PATENT DOCUMENTS

WO   WO2015/195936 A1 *  12/2015   ....... G06F 17/30156

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Shahid A Alam
(74) *Attorney, Agent, or Firm* — Womble Bond Dickinson (US) LLP; Daniel E. Ovanezian

(57) ABSTRACT

A data block may be received. Hash values correspond to portions of the data block may be generated. A determination that none of the plurality of hash values matches with another hash value associated with a previously received data block may be made. In response to determining that none of the plurality of hash values match with the other hash value associated with the previously received data block, a subset of the plurality of hash values may be stored based on a first alignment and a second alignment.

13 Claims, 6 Drawing Sheets

(56) References Cited

U.S. PATENT DOCUMENTS

| | | | |
|---|---|---|---|
| 8,645,649 B2 | 2/2014 | Kaiya et al. | |
| 8,732,411 B1* | 5/2014 | Chatterjee | G06F 3/0641 |
| | | | 711/147 |
| 9,063,937 B2 | 6/2015 | McDowell et al. | |
| 9,294,567 B2 | 3/2016 | Hussain et al. | |
| 9,430,412 B2 | 8/2016 | Huang | |
| 9,501,245 B2 | 11/2016 | Hussain et al. | |
| 9,565,269 B2 | 2/2017 | Malwankar et al. | |
| 2004/0073617 A1* | 4/2004 | Milliken | G06F 21/562 |
| | | | 709/206 |
| 2008/0034167 A1 | 2/2008 | Sharma et al. | |
| 2010/0250896 A1* | 9/2010 | Matze | G06F 3/0608 |
| | | | 711/216 |
| 2011/0213754 A1* | 9/2011 | Bindal | G06F 11/1453 |
| | | | 707/641 |
| 2012/0096564 A1* | 4/2012 | Li | G06F 21/64 |
| | | | 726/26 |
| 2012/0166448 A1* | 6/2012 | Li | G06F 16/137 |
| | | | 707/747 |
| 2014/0223029 A1* | 8/2014 | Bhaskar | H03M 7/3088 |
| | | | 709/247 |
| 2014/0310476 A1* | 10/2014 | Kruus | G06F 12/0871 |
| | | | 711/133 |
| 2015/0019798 A1 | 1/2015 | Huang | |
| 2017/0024166 A1 | 1/2017 | Singh et al. | |
| 2017/0123676 A1* | 5/2017 | Singhai | G06F 3/0608 |
| | | | 707/747 |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

EFFICIENT DEDUPLICATION SIGNATURE UTILIZATION

RELATED APPLICATION

This application claims the benefit under 35 U.S.C. § 119(e) of U.S. Provisional Application 62/330,728 filed on May 2, 2016, which is hereby incorporated by reference.

TECHNICAL FIELD

The present disclosure is generally related to hash values, and more particularly, to recording a subset of hash values of a data block based on alignments.

BACKGROUND

Data deduplication is a process to eliminate or remove redundant data to improve the utilization of storage resources. For example, during the deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
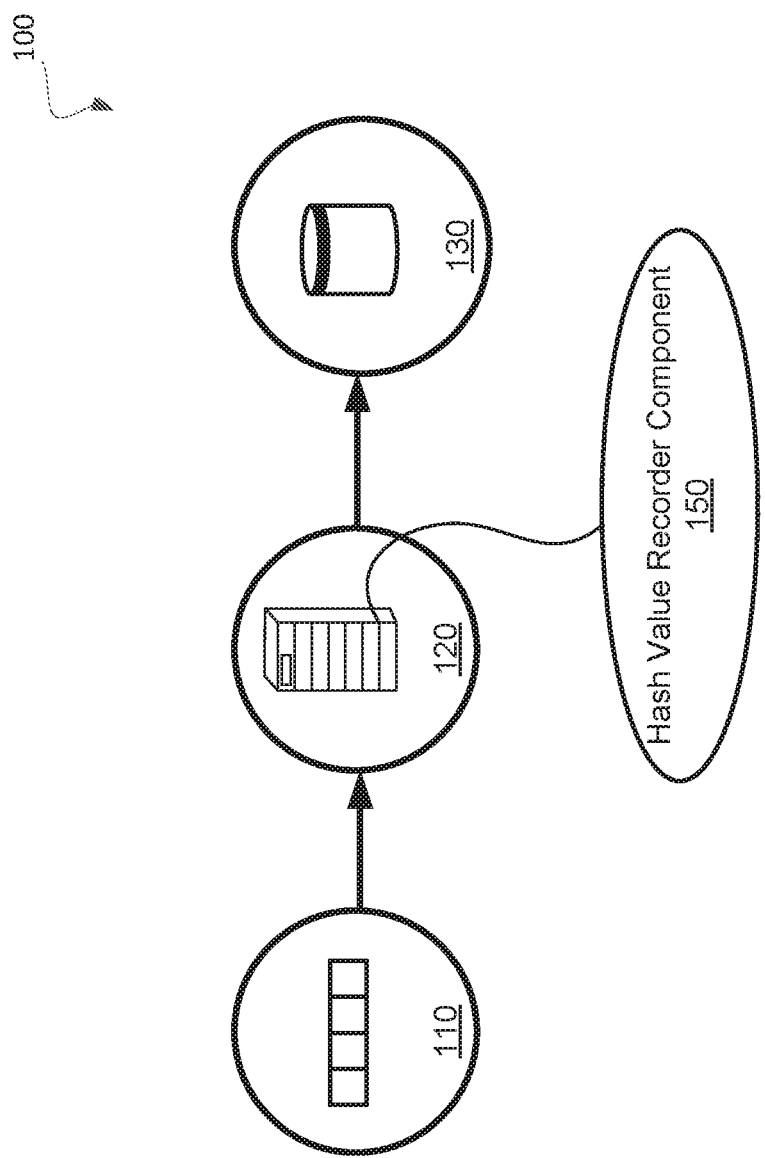
FIG. 1 illustrates an example environment of data deduplication using a deduplication map that records hash values based on alignments in accordance with some embodiments of the present disclosure.

Aspects of the present disclosure relate to recording a subset of hash values of a data block in a deduplication map based on alignments. For example, data blocks may be analyzed by a deduplication process to determine whether a duplicate or copy of the data block is currently stored at a storage system. The deduplication process may use a hash function that generates a hash value based on the data block. The generated hash value may be compared with hash values of a deduplication map that identifies currently stored data blocks at the storage system. If the generated hash value matches with any of the hash values in the deduplication map, then the data block may be considered to be a copy or duplicate of another data block that is currently stored at the storage system.

The deduplication process may generate multiple hash values for a data block. For example, a hash value may be generated for different portions of the data block and the hash values for each of the different portions may be compared with hash values in a deduplication map. If any of the generated hash values match with another hash value in the deduplication map, then the data block may be considered a duplicate or copy of another data block. Instead of storing the contents of the data block, a pointer to a currently stored data block corresponding to the matching hash value in the deduplication map may be used to replace the contents of the data block at the storage system. Otherwise, if none of the generated hash values for the different portions of the data block matches with another hash value in the deduplication map, then the data block may not considered to be a duplicate of a currently stored data block. The data block may then be stored at the storage system and the hash values for the data block may be stored in the deduplication map to be compared with subsequent hash values of subsequently received data blocks.

Storing all of the hash values for the different portions of a data block may result in additional resources that are to be used to maintain and store the deduplication map. For example, additional storage resources of the storage system may be needed to store all of the hash values. Aspects of the present disclosure may address the above and other deficiencies by selecting a subset of the hash values of the data block to be recorded in the deduplication map based on alignments. In general, the alignments may identify portions of the data block for which a generated hash value of a data block should be recorded in the deduplication map. For example, the alignments may identify a first portion of the data block that is used by a hash function to generate a first hash value and a second portion of the data block that is used by the hash function to generate a second hash value. If generated hash values of the data block do not match with another hash value in the deduplication map, then the first hash value and the second hash value of the data block may be recorded in the deduplication map as opposed to all of the hash values for all of the different portions of the data block. Thus, fewer resources may be used to maintain and store the deduplication map.

The alignments may include a first alignment that may be based on a characteristic of the storage system. For example, the first alignment may be based on an alignment within a volume of the storage system (e.g., a 4 kilobyte (KB) or 8 KB aligned to a 4 KB or 8 KB boundary relative to the beginning of the logical address space of the volume of the storage system). In some embodiments, the first alignment may be based on a location of an operating system partition of a volume of the storage system (e.g., by examining partition maps associated with a Master Boot Record or an EFI or GPT partition table, as discovered by the storage system by reading the volume in search of the relevant data formats). Logical volumes indicated by a volume manager (such as Linux's Logical Volume Manager tools) running external to the storage device may also be decoded and used for determining the first alignment. Furthermore, a second alignment may be based on a characteristic of the received data block. For example, the second alignment may be based on an alignment within the data block (e.g., with a 24 KB write, the implementation may align with the first, second and third 8 KB blocks within the 24 KB write, no matter the write's alignment relative to the volume or any operating system partition). In some embodiments, the second alignment may be associated with a format of data identified from the received data block or from a format of data identified from a previously received data block. For example, a data block may indicate an archive format, such as the Portable Operating System Interface (POSIX) TAR or copy in copy out (CPIO) formats, or may be a copy of a virtual machine image file, and a set of received data blocks may appear as a collection of writes associated with writing such an archive format or virtual machine image file.

Thus, the first alignment and the second alignment may be used to identify different portions of the data block. The first alignment and the second alignment may identify a natural alignment for data blocks. Thus, hash values based on the natural alignments (e.g., based on the storage system and based on the data block itself) may be recorded in the deduplication map because subsequent hash values associated with subsequent data blocks that are duplicates of earlier received blocks or fragments of blocks are more likely to match against hash values based on these natural alignments.

FIG. 1 illustrates an example environment 100 to record a subset of hash values of a data block in a deduplication map based on alignments. In general, the environment 100 may include a storage server 120 that includes a hash value recorder component 150 that receives a stream or series of data blocks 110 for storing in a storage resource 130.

The data deduplication process may be an inline data deduplication process where a data block is received and then analyzed before being stored in a storage resource. For example, the data deduplication process may determine whether a copy of the data block that is received is already stored in the storage resource (e.g., a solid-state non-volatile memory such as flash memory) before storing the received data block in the storage resource. Thus, the inline data deduplication process may be performed as a stream of data blocks are received to be stored in the storage resource.

As shown in FIG. 1, the hash value recorder component 150 may receive a stream of data blocks 110. In some embodiments, the stream of data blocks 110 may be a series of data blocks that are to be stored at storage resources that are managed by a storage system (e.g., a flash storage array system or solid-state storage array) that includes the hash value recorder component 150. The hash value recorder component 150 may perform a hash function on each data block of the stream of data blocks 110 to generate a corresponding hash value before determining whether to store the data block at the storage resource 130. The deduplication process may be referred to as an inline deduplication process as the data blocks 110 are analyzed to determine whether a copy or duplicate is currently stored at the storage system before storing the data blocks 110.

Figure 2:
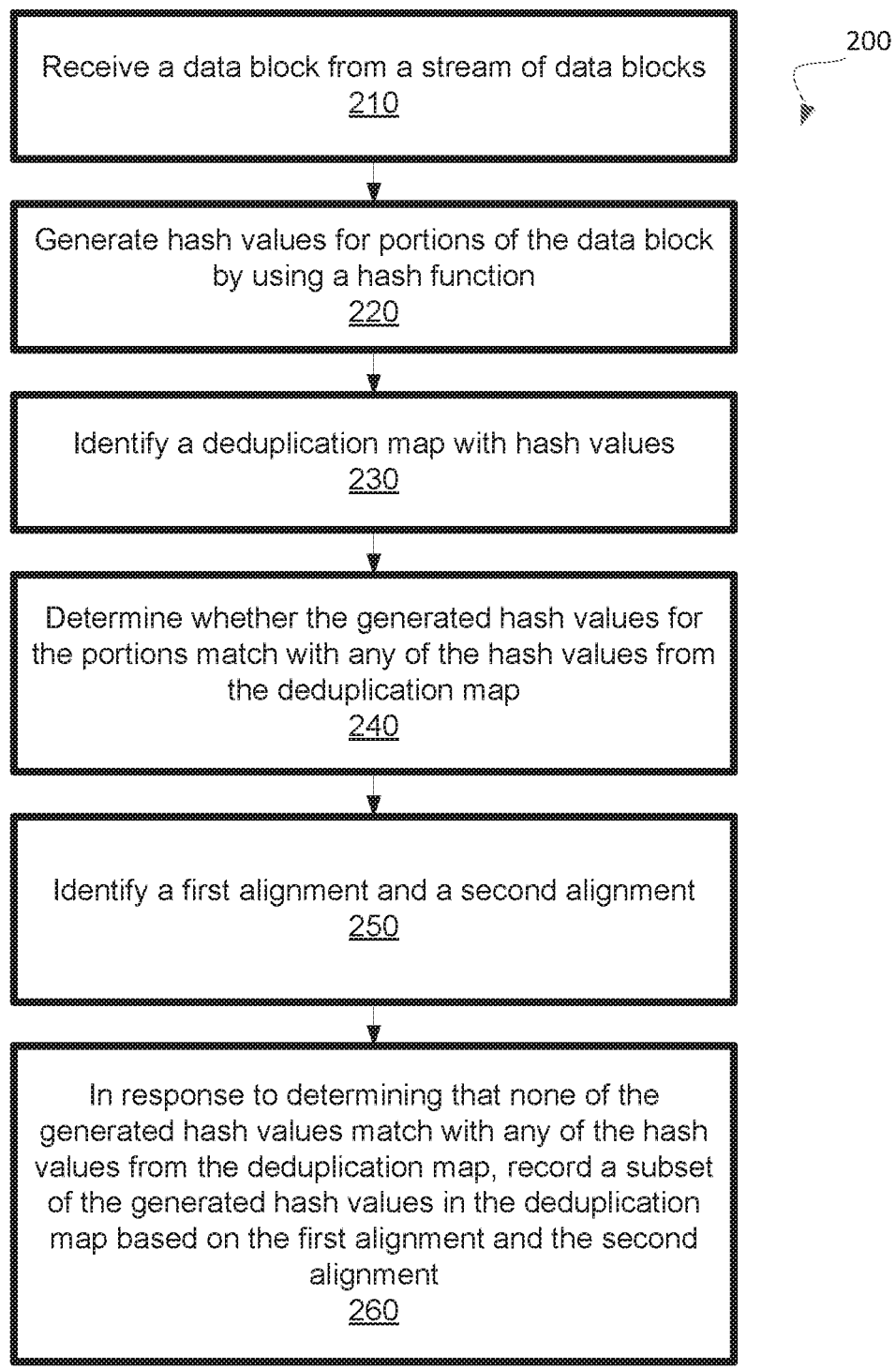
FIG. 2 illustrates an example method to record a subset of the hash values generated for different portions of a data block in accordance with some embodiments of the present disclosure.

As described in further detail with regard to FIG. 2, the hash value recorder component 150 may generate hash values for different portions of a data block 110 and compare the hash values with other hash values of a deduplication map to determine whether a copy of the data block 110 is currently stored in the storage resource 130. The hash value recorder component 150 may be implemented by a computer system or storage controller of a flash storage array system. In some embodiments, the hash value recorder component 150 may be implemented by processing logic that may include hardware (e.g., processing device, circuitry, dedicated logic, programmable logic, microcode, hardware of a device, integrated circuit, etc.), software (e.g., instructions run or executed on a processing device), or a combination thereof.

The storage resource 130 may correspond to non-disk storage media that is managed by or coupled with the hash value recorder component 150. For example, the storage resource 130 may be one or more solid-state drives (SSDs), flash memory based storage, any type of solid-state non-volatile memory, or any other type of non-mechanical storage device. In some embodiments, the storage resource 130 may be a storage device that includes a flash memory.

FIG. 2 illustrates an example method 200 to record a subset of the hash values generated for different portions of a data block. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the hash value recorder component 150 of FIG. 1 may perform the method 200.

As shown in FIG. 2, the method 200 may begin with the processing logic receiving a data block from a stream of data blocks (block 210). For example, a stream of multiple data blocks that are to be stored in a storage resource of a storage system may be received. The stream of multiple data blocks may be analyzed by a data deduplication process before being stored in the storage resource. The processing logic may further generate hash values for portions of the data block by using a hash function (block 220). For example, a sliding window may identify different portions of the data block and the hash function may generate a separate hash value for each of the different portions of the data block. In some embodiments, the data block may include a number of sectors and the sliding window may identify a subset of the number of sectors of the data block. Further details with regard to the sliding window and the different portions of the data block are described in conjunction with FIG. 3. The processing logic may further identify a deduplication map with hash values (block 230). The deduplication map may include hash values of previous portions of data blocks that were previously received and are currently stored at the storage system. The processing logic may subsequently determine whether the generated hash values for the portions of the data block match with any of the hash values from the deduplication map (block 240). For example, a determination may be made as to whether any of the generated hash values for any of the portions of the data block matches with any hash value of a currently stored data block. If at least one of the generated hash values for the portions of the data block matches with at least one of the hash values from the deduplication map, then the processing logic may record that the portion of the data block is a duplicate of a portion of another data block. Instead of storing the data block, a reference to a physical location associated with the other data block with the matching hash value may be recorded. For example, when the portion of the data block is to be stored in the storage resource, the portion may include a pointer to the physical location within the storage resource that stores the duplicate portion of the other data block.

The processing logic may further receive a first alignment and a second alignment (block 250). The first alignment may be based on a characteristic of the storage system that currently stores data blocks and for which the data block is to be stored if no hash value matches another hash value in the deduplication map. The characteristic of the storage system may be a logical partition of the storage system that may identify a natural alignment of data based on the logical partition of a storage volume of the storage system. For example, the characteristic may be an operating system partition of a volume of the storage system that is to store the received data block or stores the previously received data blocks. In some embodiments, the first alignment may correspond to a logical partition that a virtual machine applies when providing the data blocks to the storage system. The second alignment may be based on a characteristic of the received data block. For example, the second alignment may be based on a file format or a type of file that includes the data block or from a format of data identified from a prior data block (e.g., a first data block of a write operation that includes or is associated with the received data block). The second alignment may identify a location of a header in the data block based on the type of file that includes the data block and may identify a location where the header of the data block ends and data corresponding to contents of the data block begins. In some embodiments, the second alignment may be associated with a format of data that is identified by the received data block or is associated with a format of data that is identified by a previously received data block that is a first data block of a write operation or transaction (e.g., a stream of data blocks) that includes the received data block.

Furthermore, if none of the generated hash values matches with any of the hash values from the deduplication map, then the processing logic may record a subset of the generated hash values in the deduplication map based on the first alignment and the second alignment (block 260). For example, a first hash value that is generated by using the hash function with a first portion of the data block that is identified by the first alignment (e.g., based on the storage system) and a second hash value that is generated by using the same hash function with a different second portion of the data block that is identified by the second alignment (e.g., based on the data block) may be recorded or stored in the deduplication map for subsequent comparison of subsequent hash values of subsequently received data blocks.

Figure 3:
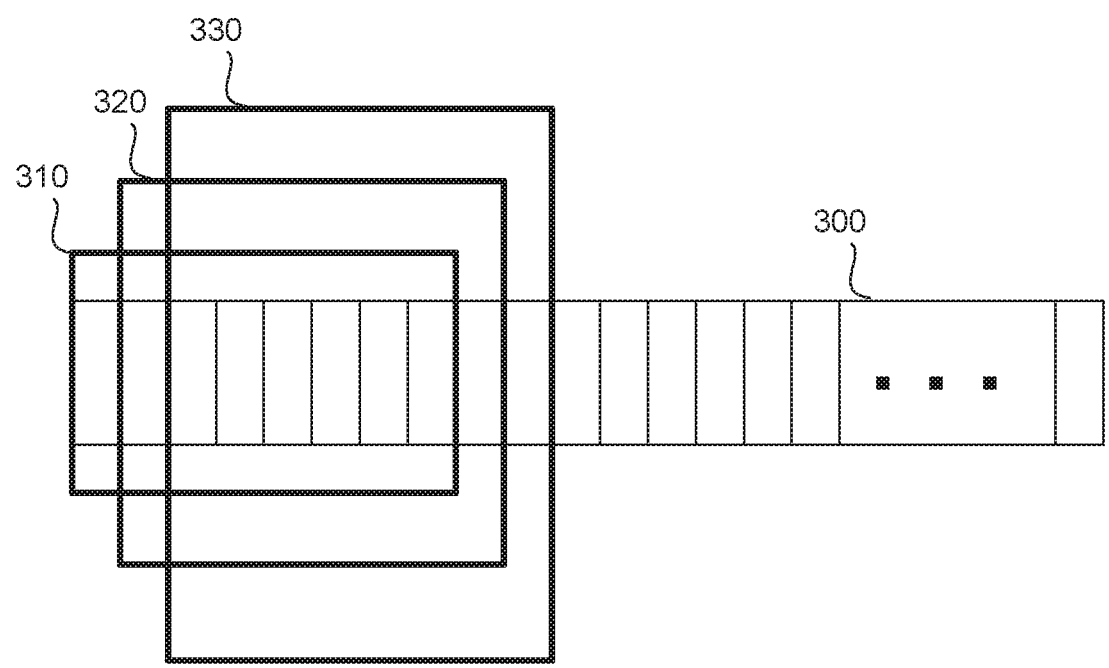
FIG. 3 illustrates an example use of a sliding window to identify different portions of a data block in accordance with some embodiments.

FIG. 3 illustrates an example use of a sliding window to identify different portions of a data block. In general, the sliding window may be determined by the hash value recorder component 150 of FIG. 1.

As shown in FIG. 3, a sliding window may be shifted across sectors of a data block 300 to identify different groups of the sectors or different portions of the data block. For example, at a first time, the sliding window may identify a first portion 310 of the sectors of the data block. As shown, the sliding window may identify the first eight sectors out of a larger number of sectors of the data block 300. At a second time, the sliding window may be shifted or offset by one sector to identify a second portion 320 of the sectors of the data block 300. As shown, the sliding window may identify the second through ninth sectors of the data block 300. Furthermore, the sliding window may then be shifted or offset again by another sector to identify a third portion 330 that includes the third sector through tenth sectors of the data block 300. The sliding window may continuously be shifted or offset through the sectors of the data block until the final eight sectors of the data block are identified by the sliding window.

For each portion of the data block 300 (e.g., each group of sectors contained by the sliding window) identified by the sliding window, a hash function may be performed to generate a corresponding hash value. For example, a first hash value may be generated for the sectors of the first portion 310, a second hash value may be generated for the sectors of the second portion 320, and a third hash value may be generated for the sectors of the third portion 330. As such, multiple hash values may be generated for multiple portions of the data block 300 that correspond to different groups of sectors of the data block 300. Each of the generated hash values may then be used in the data deduplication process with the deduplication map as earlier described. For example, each hash value for each of the portions of the data block 300 may be compared with other hash values stored in the deduplication map to determine whether any portion of the data block 300 is a duplicate of another portion of another data block that is currently stored at the storage system.

As previously described, the hash values of the different portions of the data block 300 may be recorded in a deduplication map based on the first alignment and the second alignment that each specify a particular portion of the data block. The alignments may be used to specify an offset relative to the data block. In some embodiments, the difference between the start of the data block and the start of the portion of the data block may be identified by the offset that is based on the respective alignment. For example, the data block may include 32 sectors or be split in 32 different groups of data. A first alignment may specify an offset of two that may identify that the start of the portion of the data block identified by the static window for a first hash value may be the third sector (e.g., two sectors from the start of the data block) and a second alignment may specify a second offset of thirteen that may identify that the start of the portion of the data block that is identified by the static window for a second hash value may be the fourteenth sector. Thus, the first alignment and the second alignment may specify a first offset and a second offset that are used to identify a first portion of the data block and a second portion of the data block for which a first hash value and a second hash value are stored in a deduplication map.

Figure 4:
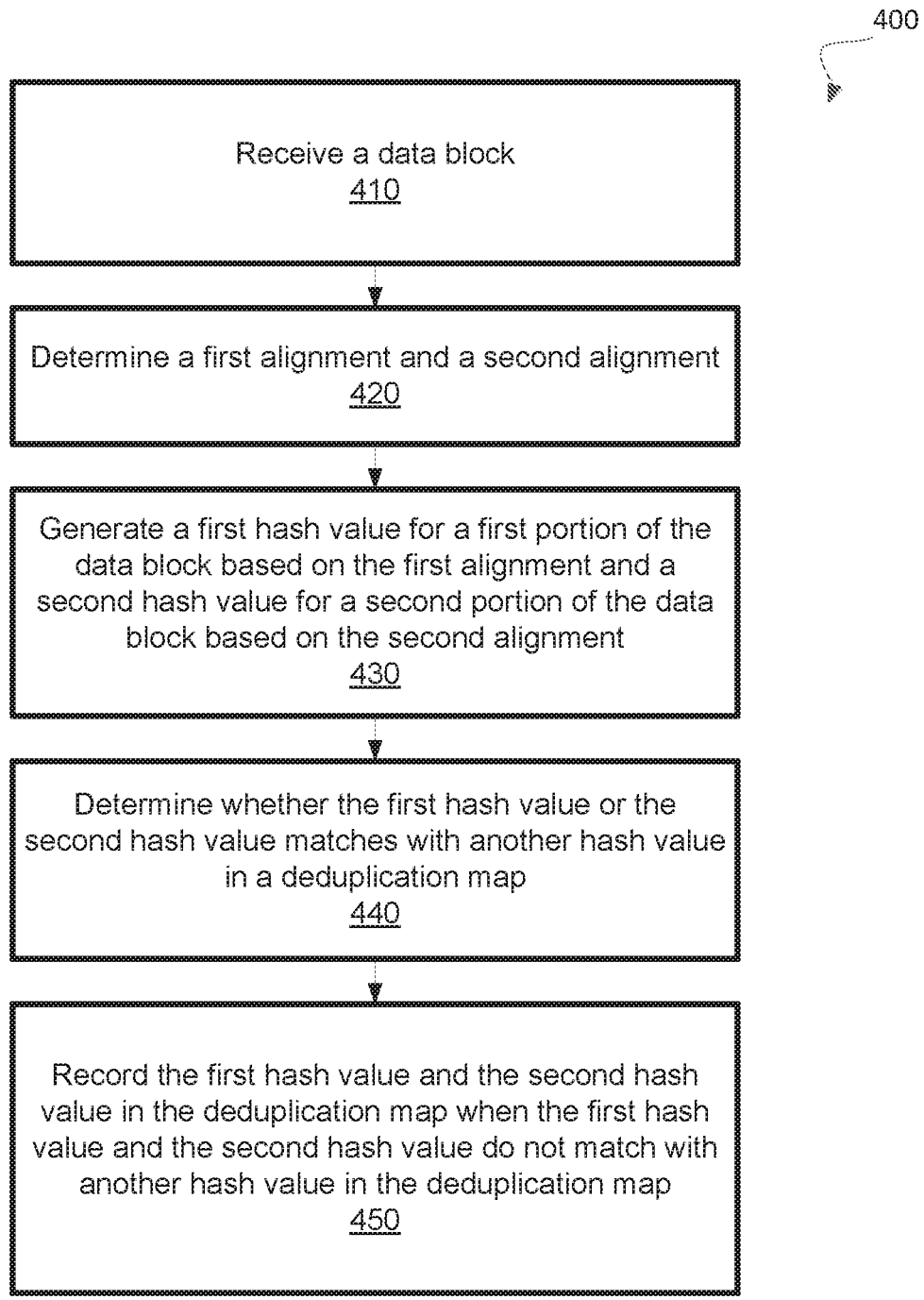
FIG. 4 is an example method to generate hash values for a subset of the different portions of the data block based on alignments in accordance with some embodiments.

FIG. 4 illustrates an example method 400 to generate hash values for a subset of the different portions of the data block based on alignments. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the hash value recorder component 150 of FIG. 1 may perform the method 400.

As shown in FIG. 4, the method 400 may begin with the processing logic receiving a data block (block 410). Furthermore, the processing logic may identify a first alignment and a second alignment as previously described (block 420). The processing logic may subsequently generate a first hash value for a first portion of the data block based on the first alignment and a second hash value for a second portion of the data block based on the second alignment (block 430). Thus, hash values of different portions of the data block may be generated based on the first alignment and the second alignment while other portions of the data block that are not identified by the first alignment and the second alignment are not generated. The processing logic may further determine whether the first hash value or the second hash value matches with another hash value in a deduplication map (block 440). If the first hash value or the second hash value are identified as matching with another hash value in the deduplication map, then the data block may be considered a copy or duplicate of another data block. Otherwise, if neither the first hash value nor the second hash value matches with another hash value in the deduplication map, then the processing logic may record the first hash value and the second hash value in the deduplication map (block 450).

Thus, hash values may be generated for the data block based on portions that are identified by the first alignment and the second alignment while other hash values for other portions of the data block that are not identified by the first alignment and the second alignment are not generated for the data block. As such, the look up for the hash values of the data block with other hash values of the deduplication map may be based on the first alignment and the second alignment.

In some embodiments, a hash value may be generated based on each portion of the data block based on shifting the sliding window by one sector to identify each different portion of the data block. A first type of lookup function to identify the different portions identified by the first alignment or the second alignment may be performed to determine whether the corresponding hash value is in the deduplication map while a second type of lookup function may be used to determine whether the hash values of the other portions of the data block that are not identified by the first alignment and the second alignment. The first type of lookup function may utilize more resources (i.e., a higher resource utilization) than the second type of lookup function. Thus, the portions of the data block that correspond to natural alignment of data may be subjected to a more accurate matching with the deduplication map.

Figure 5:
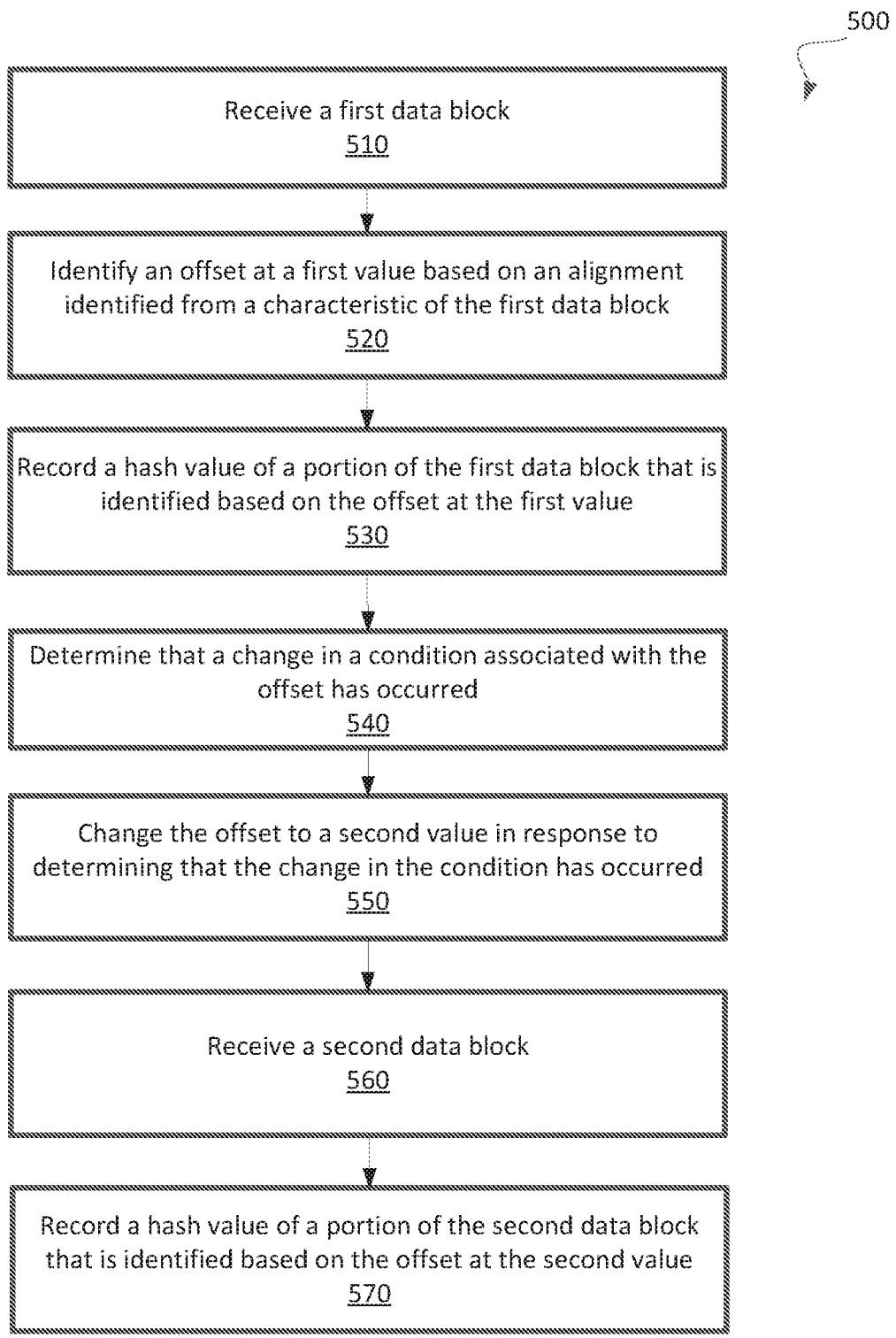
FIG. 5 is an example method to detect a change in an alignment based on a change of a condition associated with a data block in accordance with some embodiments.

FIG. 5 is an example method 500 to detect a change in an alignment based on a change of a condition associated with a data block. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the hash value recorder component 150 of FIG. 1 may perform the method 500.

As shown in FIG. 5, the method 500 may begin with the processing logic receiving a first data block (block 510). For example, a first data block from a stream or series of data blocks may be received. The processing logic may identify an offset at a first value based on an alignment identified from a characteristic of the first data block (block 520). The alignment may be identified from a format of data that is identified from the first data block or from a format of data that is identified from a prior data block. In some embodiments, the alignment may specify a file format or a type of file that is associated with the first data block. For example, the first data block may be part of a series of data blocks that are each a portion of a particular type of file. The processing logic may further record a hash value of a portion of the first data block that is identified based on the offset at the first value (block 530). The hash value may be recorded in response to determining that no hash value for any portion of the first data block matches with another hash value stored in the deduplication map.

Referring to FIG. 5, the processing logic may determine that a change in a condition associated with the offset has occurred (block 540). The condition may be based on a threshold amount of time having been elapsed since the offset at the first value was used to record the hash value of the portion of the first data block that is identified based on the offset at the first value. For example, multiple subsequent data blocks may be received after the first data block has been received and the hash value of the portion of the first data block has been recorded. For a particular subsequent data block that is subsequently received, the offset may remain at the first value if the threshold amount of time has not elapsed. Thus, each hash value for each subsequent data block may be based on the same relative portion (e.g., the same offset) for each respective data block that is received within the threshold amount of time. Otherwise, if a subsequent data block is received outside of the threshold amount of time, then a different portion of the subsequent data block may be selected or identified to generate a subsequent hash value as described in further detail below. In some embodiments, the change in the condition associated with the offset may correspond to a change in a detected format of data identified from a subsequently received data block or a change detected from a header of the subsequently received data block.

The processing logic may subsequently change the offset to a second value in response to determining that the change in the condition has occurred (block 550). In some embodiments, the second value may correspond to a default offset value that is used in response to the threshold amount of time having elapsed. The default offset value may correspond to an offset value of zero indicating that the first portion of the data block is to be identified. The second value may correspond to a second format of data that is different than the first format of data of the first data block. Subsequently, the processing logic may receive a second data block (block 560) and may record a hash value of a portion of the second data block that is identified based on the offset at the second value (block 570). For example, a different portion of the second data block (e.g., a different grouping of sectors) may be identified to record the hash value for the second data block as opposed to the first data block.

Thus, a first alignment and a second alignment may be used to specify a first offset at a first offset value and a second offset at a second offset value. A first data block may be received and a hash value for a first portion of the first data block may be recorded based on the first offset at the first offset value (e.g., corresponding to a characteristic of a storage system) and a hash value for a second portion of the first data block may be recorded based on the second offset at the second offset value (e.g., corresponding to a characteristic of the first data block). Subsequently, in response to a change in a condition, a second data block may be received and a hash value for a first portion of the second data block may be recorded based on the first offset at the same first value that corresponds to the characteristic of the storage system. However, the additional hash value for the second portion of the second data block may be recorded based on the second offset that is at a different second value that corresponds to a characteristic of the second data block.

Thus, two hash values may be recorded for each of the first data block and the second data block. An identical portion of each of the first and second data blocks may be identified based on an alignment associated with the storage system that is to store the first and second data blocks. Different portions of each of the first and second data blocks may be identified based on different alignments associated with the respective first and second data blocks.

Figure 6:
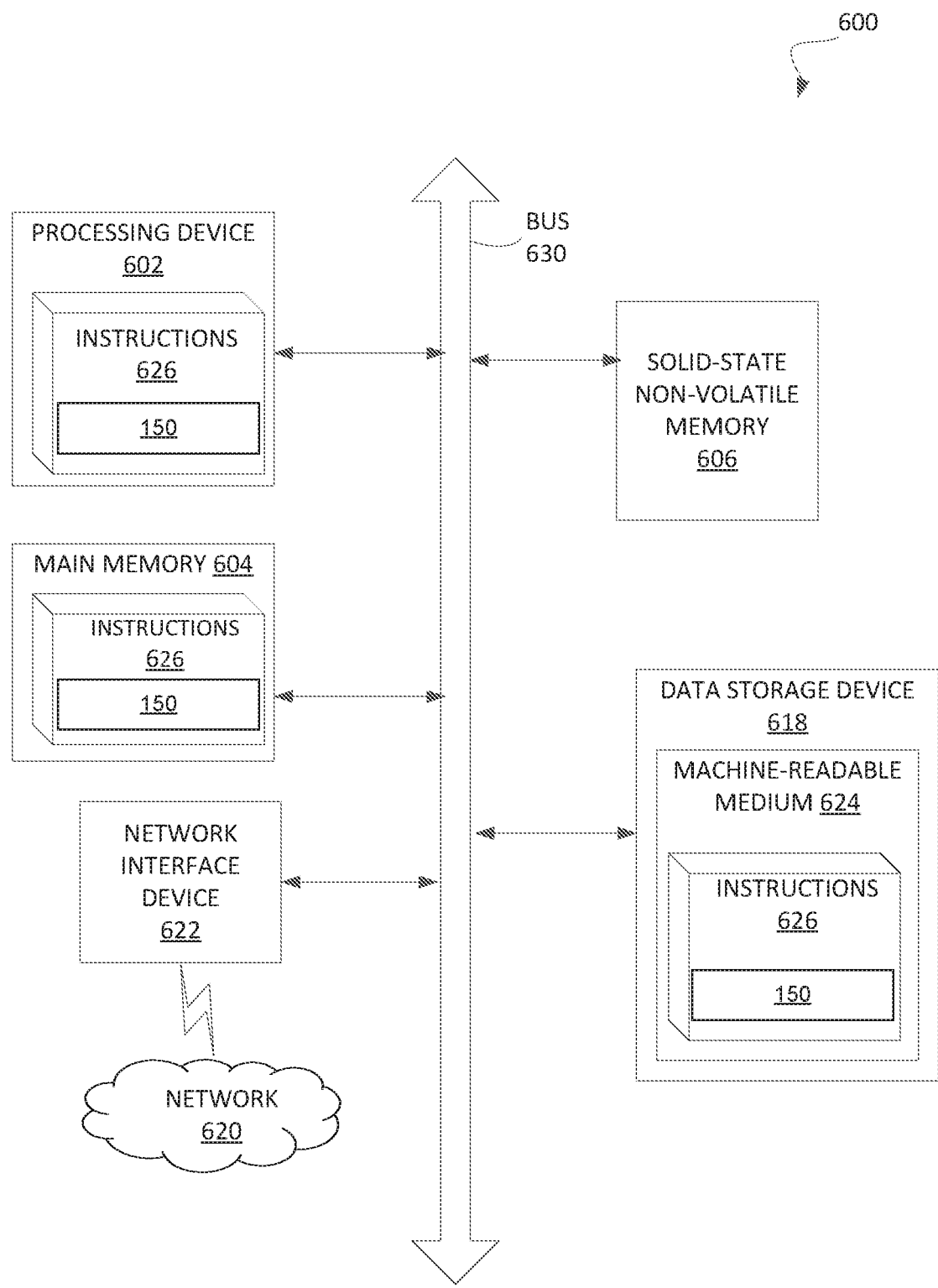
FIG. 6 is a block diagram of an example computer system operating in accordance with the disclosure described herein.

FIG. 6 depicts an example computer system 600 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a solid-state non-volatile memory 606 (e.g., flash memory, 3D crosspoint (XPoint) memory, magnetoresistive random-access memory (MRAM), or any other such storage media that does not use a physical disk), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the hash value recorder component 150 of FIG. 1 for performing the operations and steps discussed herein. The computer system 600 may further include a network interface device 622. The data storage device 616 may include a computer-readable medium 624 on which is stored the hash value recorder component 150 embodying any one or more of the methodologies or functions described herein. The hash value recorder component 150 may also reside, completely or at least partially, within the main memory 604 and/or within the processing device 602 during execution thereof by the computer system 600, the main memory 604 and the processing device 602 also constituting computer-readable media. The hash value recorder component 150 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "using," "registering," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving a data block;
   generating a plurality of hash values, each of the plurality of hash values being based on a hash function performed on a different portion of the data block;
   receiving a deduplication map identifying a plurality of previous hash values of different portions of previously received data blocks that are stored at a solid-state storage array;
   determining whether any of the plurality of hash values matches with any of the plurality of previous hash values that are identified in the deduplication map;
   in response to determining that none of the plurality of hash values match with any of the plurality of previous hash values that are identified in the deduplication map, selecting, by a processing device, a first hash value of the plurality of hash values for a first portion of the data block based on a first alignment within a volume of the solid-state storage array storing the previously received data blocks and a second hash value of the plurality of hash values for a second portion of the data block based on a second alignment within the data block, wherein the first alignment specifies a difference between a start of the data block and a start of the first portion of the data block that the hash function is performed on to generate the first hash value and wherein the second alignment specifies a second difference between the start of the data block and a start of the second portion of the data block that the hash function is performed on to generate the second hash value, and wherein the first portion of the data block is different than the second portion of the data block; and
   recording the first hash value and the second hash value in the deduplication map.

2. The method of claim 1, wherein the first alignment is associated with an operating system partition of the volume of the solid-state storage array that stores the previously received data blocks.

3. The method of claim 1, wherein the second alignment is associated with a format of data identified from the data block or from a format of data identified from a prior data block that is a first data block of a write operation that is associated with the data block.

4. The method of claim 1, further comprising:
   receiving a subsequent data block after recording the first hash value and the second hash value in the deduplication map; and
   determining whether a duplicate of the subsequent data block is stored at the solid-state storage array by using the deduplication map after recording the first hash value and the second hash value.

5. The method of claim 1, wherein the first alignment is associated with a virtual machine that provides the data block to the solid-state storage array.

6. A method comprising:
   receiving a data block;
   generating a plurality of hash values, each of the plurality of hash values being based on a hash function performed on a different portion of the data block;
   receiving a deduplication map identifying a plurality of previous hash values of different portions of previously received data blocks that are stored at a solid-state storage array;
   determining whether any of the plurality of hash values matches with any of the plurality of previous hash values that are identified in the deduplication map;
   in response to determining that none of the plurality of hash values match with any of the plurality of previous hash values that are identified in the deduplication map, selecting, by a processing device, a first hash value of the plurality of hash values for a first portion of the data block based on a first alignment within a volume of the solid-state storage array storing the previously received data blocks and a second hash value of the plurality of hash values for a second portion of the data block based on a second alignment within the data block;
   recording the first hash value and the second hash value in the deduplication map;
   identifying that the data block corresponds to data of a first format, wherein the second alignment is based on the first format;
   receiving a subsequent data block;
   identifying that the subsequent data block corresponds to data of a second format that is different than the first format; and
   in response to identifying that the subsequent data block corresponds to the data of the second format, changing the second alignment based on the second format.

7. A system comprising:
   a memory; and
   a processing device, operatively coupled with the memory, to:
   receive a data block;

generate a plurality of hash values corresponding to portions of the data block;
determine that none of the plurality of hash values matches with another hash value associated with a previously received data block;
in response to determining that none of the plurality of hash values match with the another hash value associated with the previously received data block, store a subset of the plurality of hash values based on a first alignment and a second alignment;
identify that the data block corresponds to data of a first format, wherein the second alignment is based on the first format;
receive a subsequent data block;
identify that the subsequent data block corresponds to data of a second format that is different than the first format; and
in response to identifying that the subsequent data block corresponds to data of the second format, change the second alignment based on the second format.

8. The system of claim 7, wherein the first alignment corresponds to a characteristic of a storage system storing the previously received data block.

9. The system of claim 8, wherein the characteristic of the storage system is based on a partition of a storage volume of the storage system.

10. The system of claim 7, wherein the second alignment corresponds to a format of data identified from the data block, and wherein the second alignment specifies a particular portion of the data block that is used to generate a particular hash value of the subset of the plurality of hash values that is stored.

11. The system of claim 10, wherein the second alignment is based on a location of a header corresponding to the format of the data associated with the data block.

12. The system of claim 7, wherein the processing device is further to:
identify an amount of time that has elapsed since receiving the data block; and
in response to determining that the amount of time that has elapsed exceeds a threshold, changing a value of the second alignment to another value to store a different subset of a subsequent plurality of hashes associated with a subsequently received data block.

13. The system of claim 7, wherein the plurality of hash values are stored in a deduplication map.

* * * * *